United States Patent
Umeda et al.

(10) Patent No.: US 10,663,433 B2
(45) Date of Patent: May 26, 2020

(54) ULTRASOUND IMAGING DEVICE AND METHOD OF GENERATING IMAGE FOR ULTRASOUND IMAGING DEVICE

(71) Applicant: HITACHI POWER SOLUTIONS CO., LTD., Hitachi-shi, Ibaraki (JP)

(72) Inventors: Masamichi Umeda, Ibaraki (JP); Kaoru Kitami, Ibaraki (JP); Hiroyuki Gunji, Ibaraki (JP)

(73) Assignee: Hitachi Power Solutions, Co., Ltd., Ibaraki (JP)

( * ) Notice: Subject to any disclaimer, the term of this patent is extended or adjusted under 35 U.S.C. 154(b) by 71 days.

(21) Appl. No.: 16/094,660

(22) PCT Filed: Apr. 12, 2017

(86) PCT No.: PCT/JP2017/015027
§ 371 (c)(1),
(2) Date: Oct. 18, 2018

(87) PCT Pub. No.: WO2017/183540
PCT Pub. Date: Oct. 26, 2017

(65) Prior Publication Data
US 2019/0113480 A1    Apr. 18, 2019

(30) Foreign Application Priority Data
Apr. 18, 2016    (JP) .................................. 2016-082878

(51) Int. Cl.
*G01N 29/34*    (2006.01)
*G01N 29/06*    (2006.01)
(Continued)

(52) U.S. Cl.
CPC ........... *G01N 29/221* (2013.01); *G01N 29/04* (2013.01); *G01N 29/0654* (2013.01);
(Continued)

(58) Field of Classification Search
CPC ............ G01N 29/0654; G01N 29/221; G01N 29/2437; G01N 29/04; G01N 2291/2697; G01N 2291/023
(Continued)

(56) References Cited

U.S. PATENT DOCUMENTS 4,174,634 A * 11/1979 Dory ...................... G01H 9/002
                                                        73/606
5,623,100 A    4/1997 Arima et al.
(Continued)

FOREIGN PATENT DOCUMENTS

CN      101329307    * 12/2008
JP      63-133057 A    6/1988
(Continued)

OTHER PUBLICATIONS

International Search Report and Written Opinion dated Jul. 4, 2017 for the International Application No. PCT/JP2017/015027.

*Primary Examiner* — Jacques M Saint Surin
(74) *Attorney, Agent, or Firm* — Volpe and Koenig, P.C.

(57) ABSTRACT

An object is to simultaneously visualize a plurality of junction surfaces of a workpiece. An ultrasound imaging device serving as solution means includes a signal processing unit that causes a probe to irradiate a workpiece with an ultrasound wave having a predetermined frequency, and that performs gate processing on a reflected wave of the ultrasound wave detected by the probe so as to output a displacement of the reflected wave on two junction surfaces of the workpiece, an image generation unit that generates respective images of the two junction surfaces, based on the displacement of the respective reflected waves on the two junction surfaces, and a height adjustment unit that adjusts a height of a focus of the probe. The height adjustment unit
(Continued)

adjusts the height of the probe so as to set the focus of the probe between the two junction surfaces.

10 Claims, 12 Drawing Sheets

(51) Int. Cl.
*G01N 29/04* (2006.01)
*G01N 29/24* (2006.01)
*G01N 29/22* (2006.01)

(52) U.S. Cl.
CPC ....... *G01N 29/2437* (2013.01); *G01N 29/348* (2013.01); *G01N 2291/023* (2013.01); *G01N 2291/2697* (2013.01)

(58) Field of Classification Search
USPC .......................................................... 73/642
See application file for complete search history.

(56) References Cited

U.S. PATENT DOCUMENTS

| | | | |
|---|---|---|---|
| 6,981,417 | B1 | 1/2006 | Oravecz |
| 8,794,072 | B2 * | 8/2014 | Kessler ................ G01N 29/069 73/633 |
| 9,157,896 | B2 * | 10/2015 | Ito ........................ G01N 29/069 |
| 2009/0189278 | A1 | 7/2009 | Komatsu |

FOREIGN PATENT DOCUMENTS

| | | | |
|---|---|---|---|
| JP | 02-057968 A | | 2/1990 |
| JP | 06-265529 A | | 9/1994 |
| JP | 07-294500 A | | 11/1995 |
| JP | 2008185553 | * | 8/2008 |
| JP | 2009-175136 A | | 8/2009 |
| JP | 2011-163918 A | | 8/2011 |
| JP | 2013-178101 A | | 9/2013 |
| JP | 5997861 B1 | | 9/2016 |
| WO | WO2010001853 | * | 1/2010 |

\* cited by examiner

[Fig. 1]
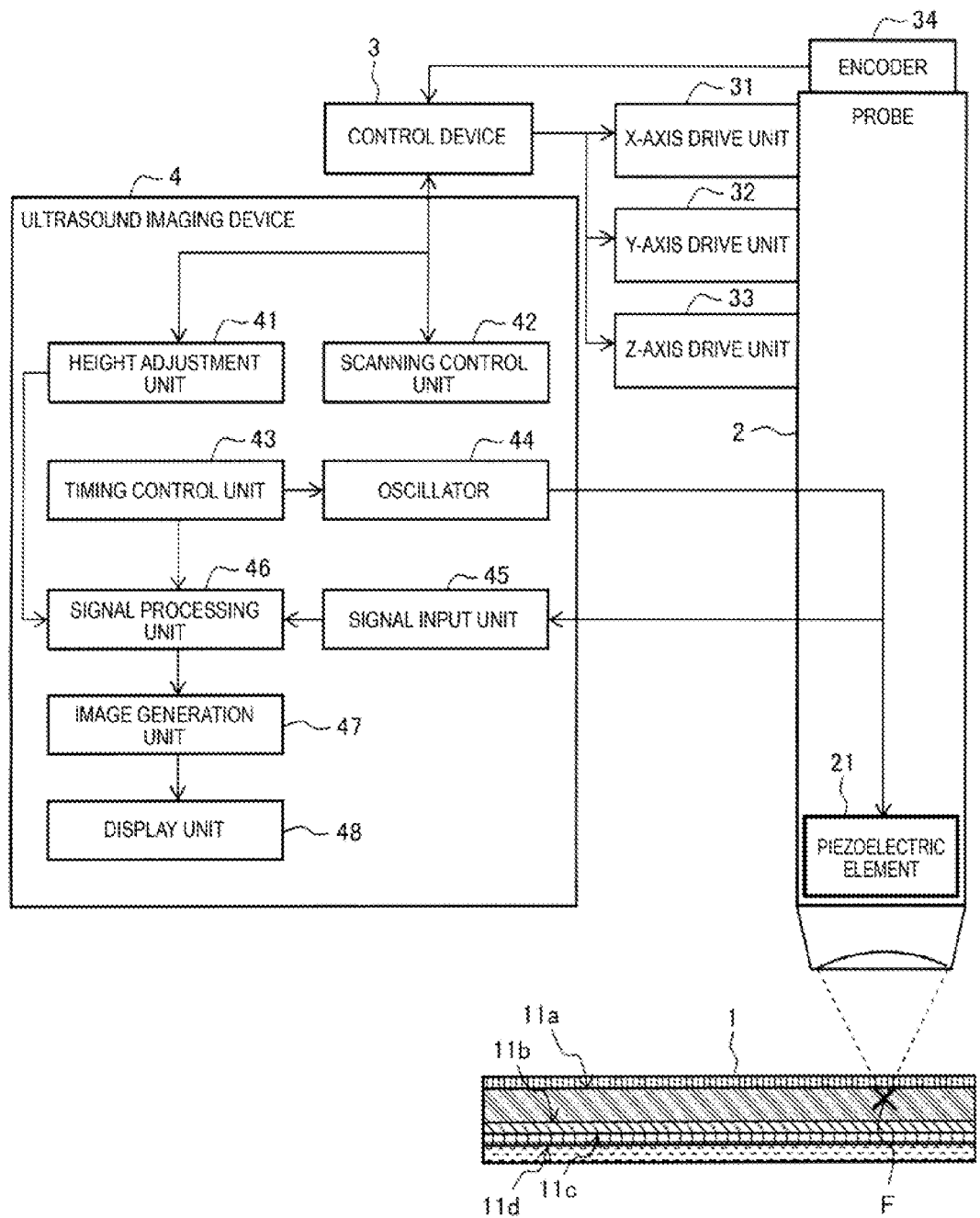

[Fig. 2]
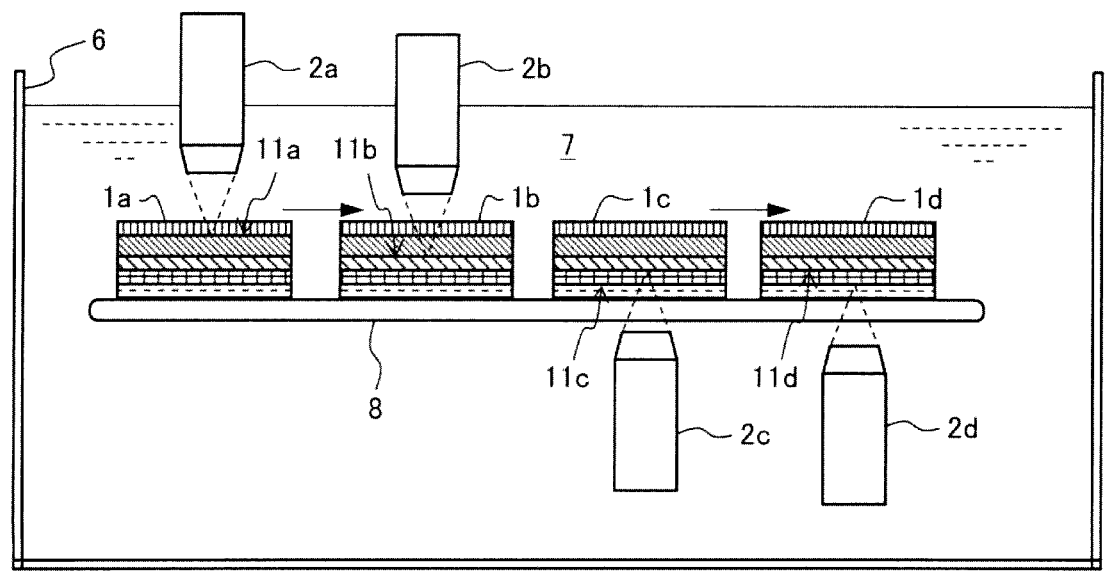
[Fig. 3]
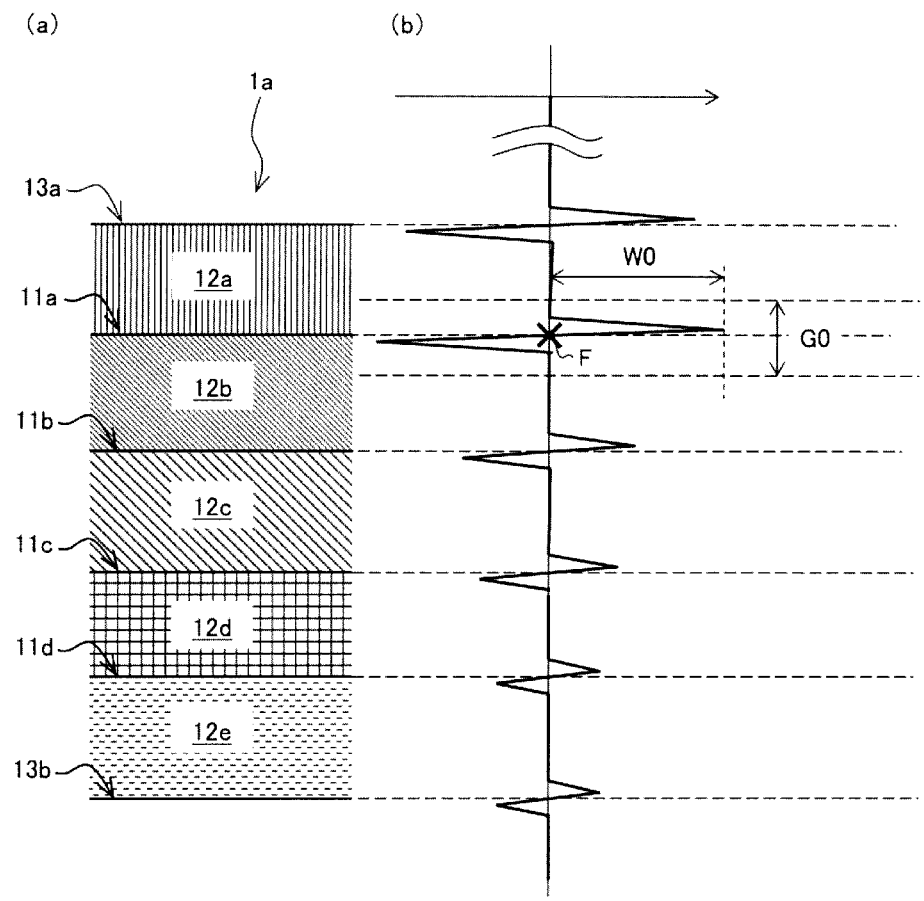

[Fig. 4]
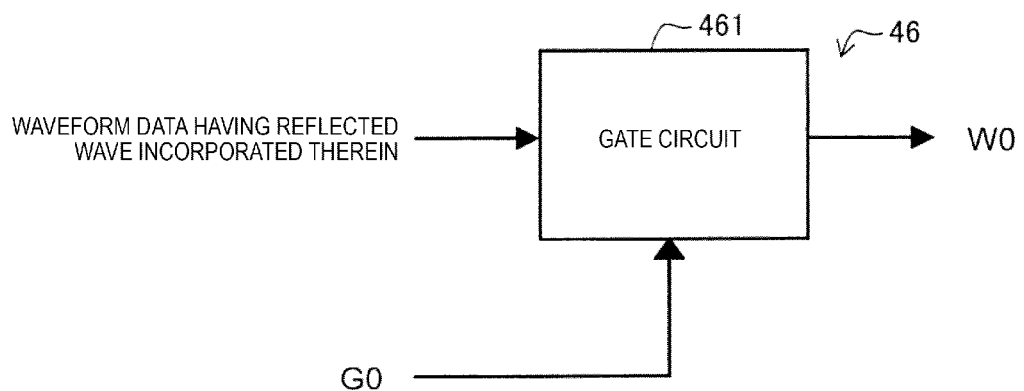

[Fig. 5]
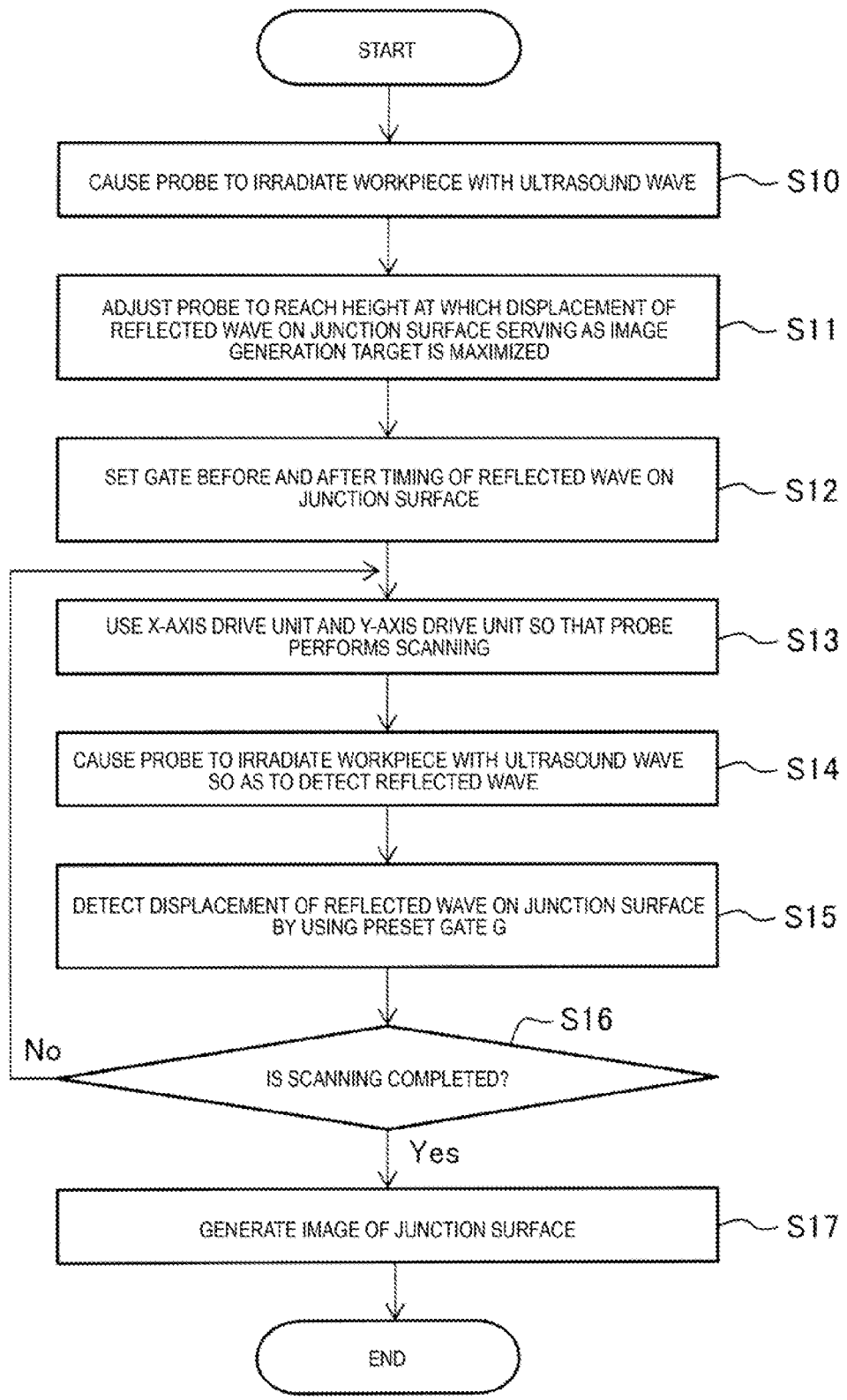

[Fig. 6]
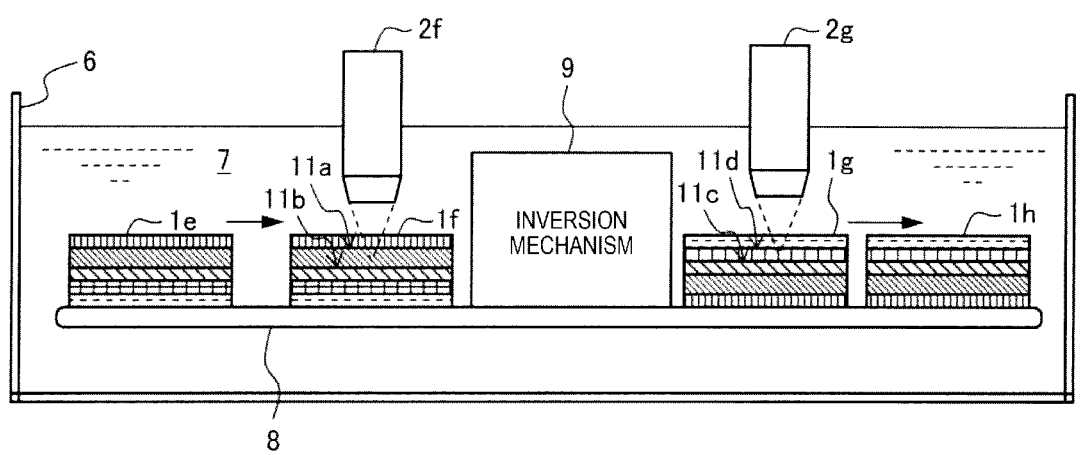

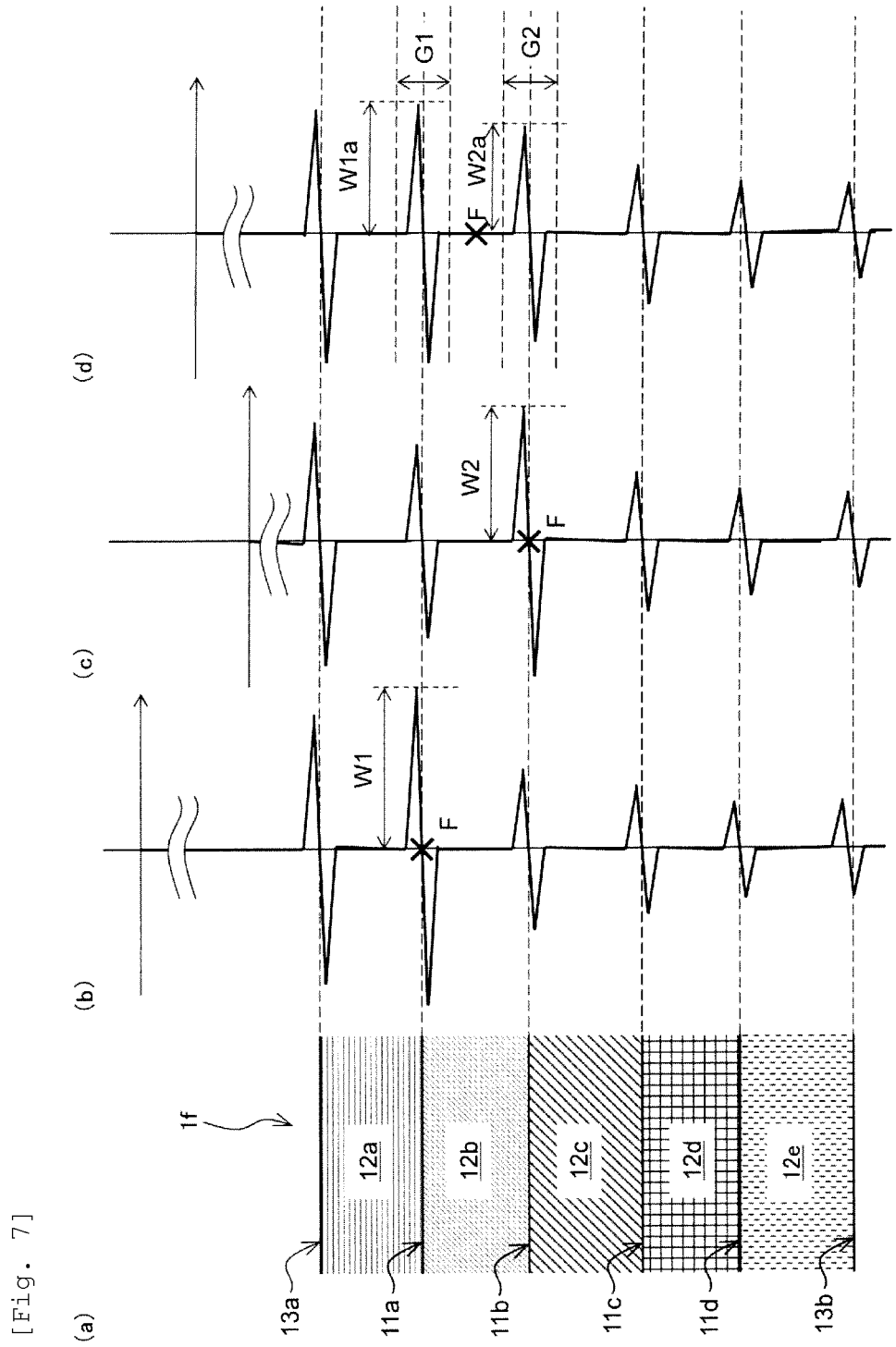

[Fig. 8]
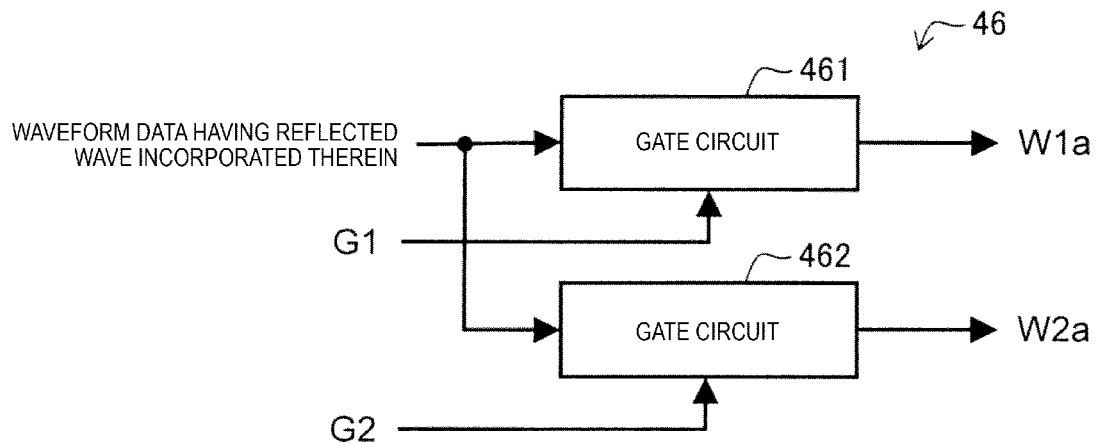
[Fig. 9]
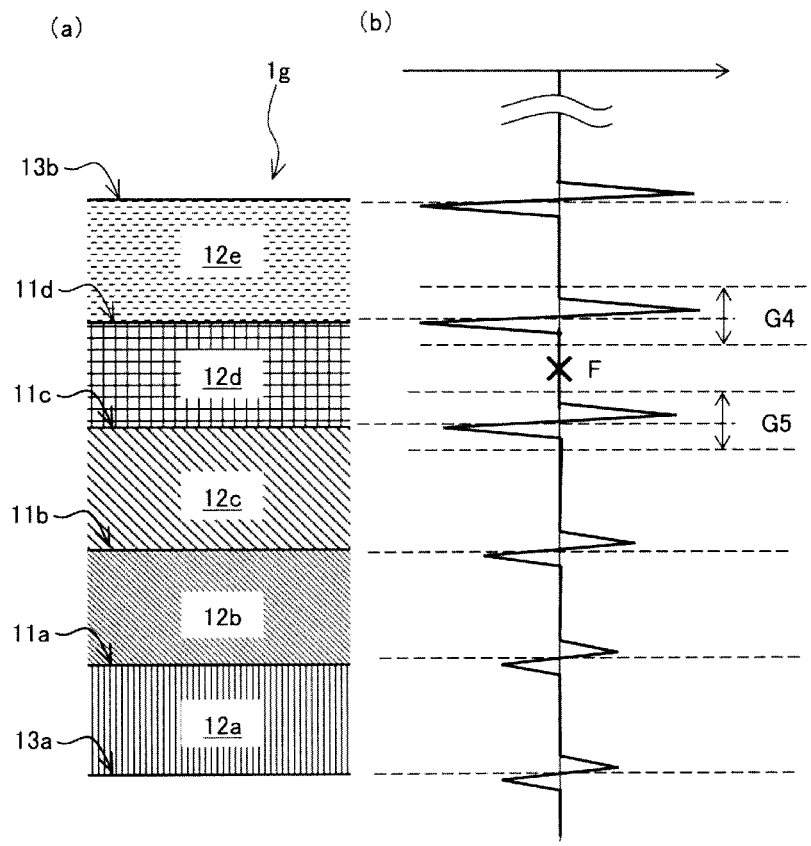

[Fig. 10]
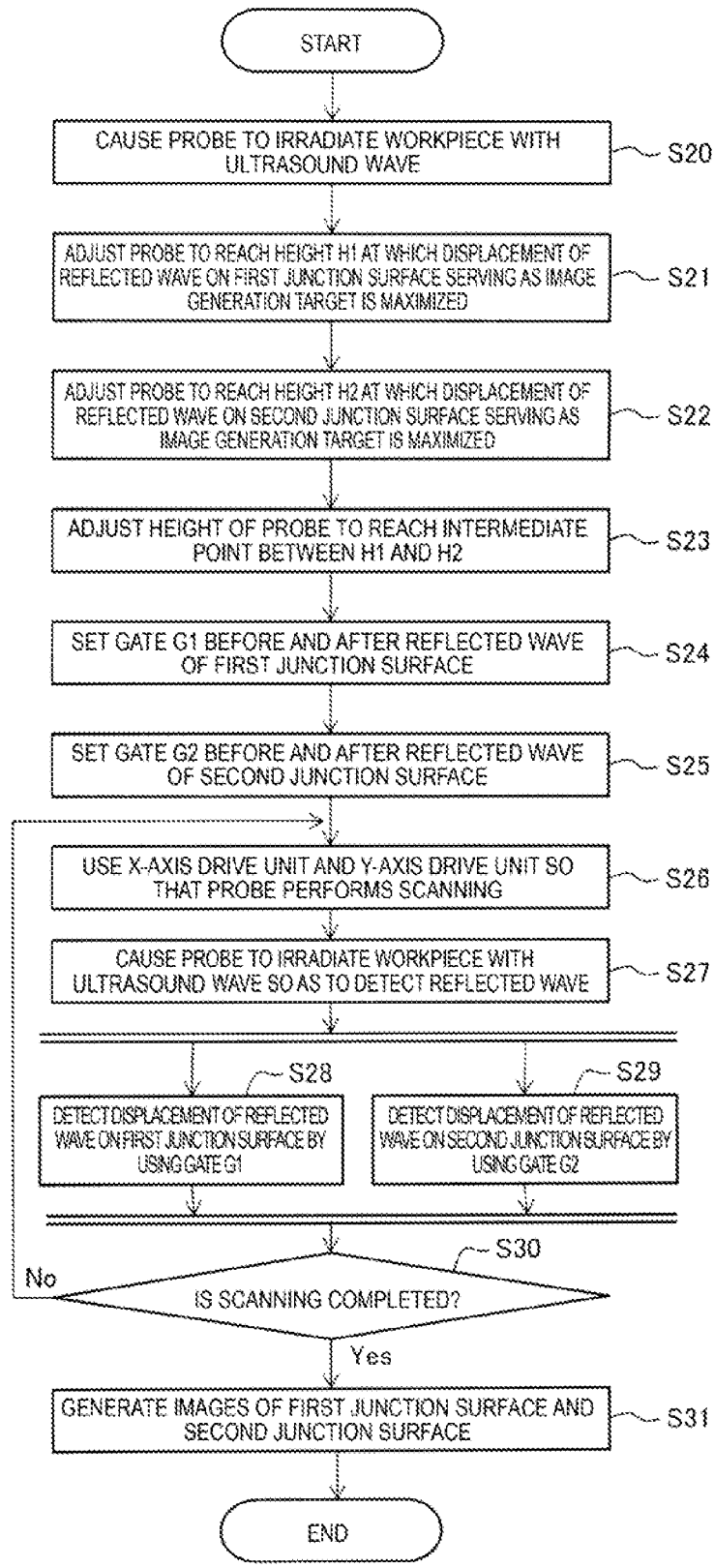

[Fig. 11]
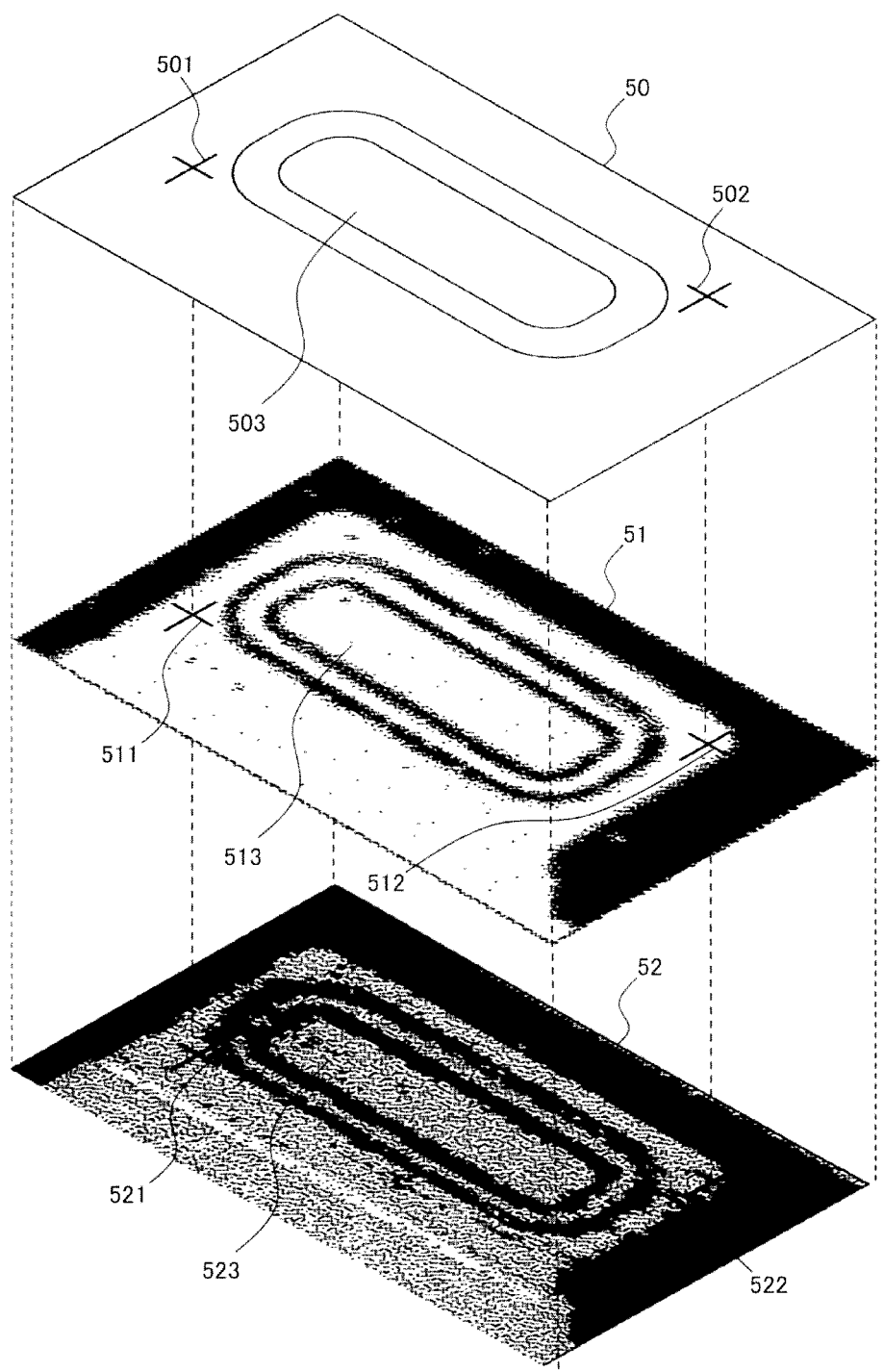

[Fig. 12]
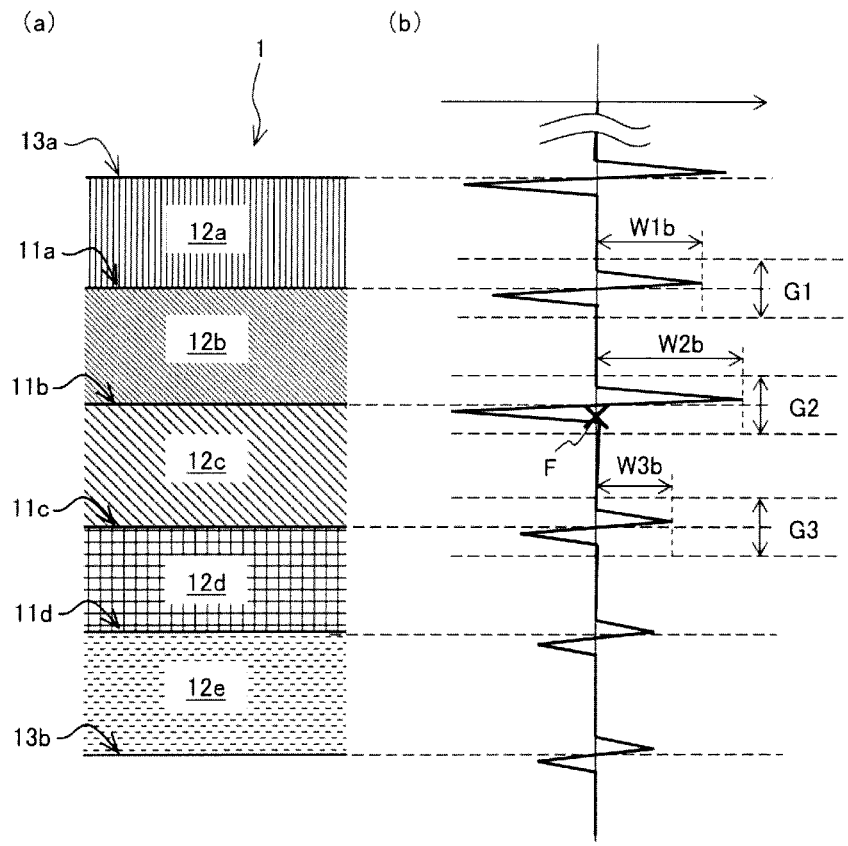
[Fig. 13]
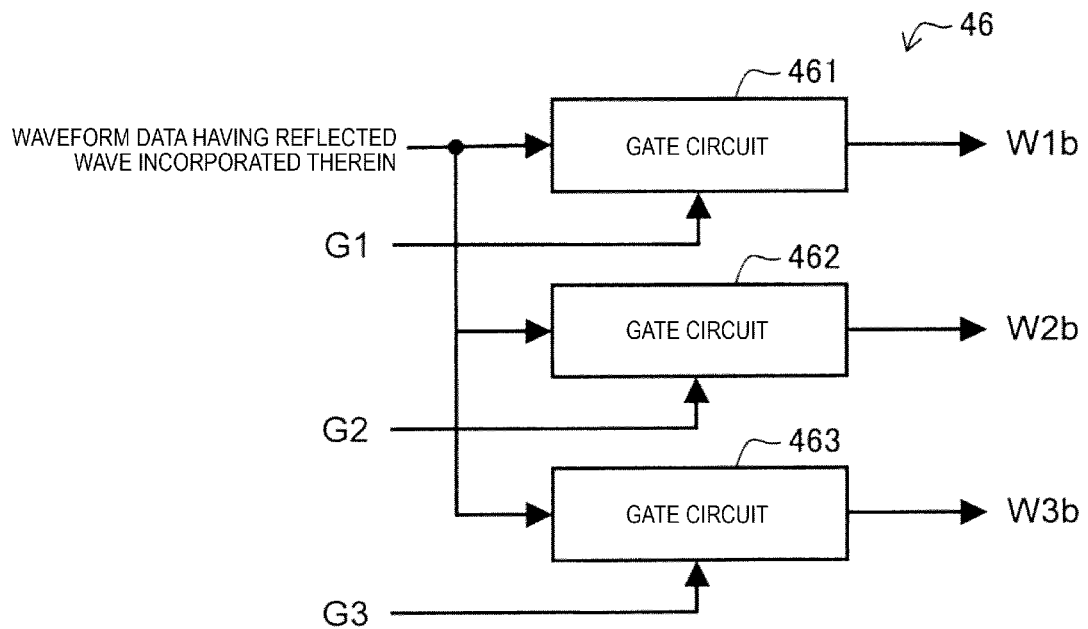

[Fig. 14]
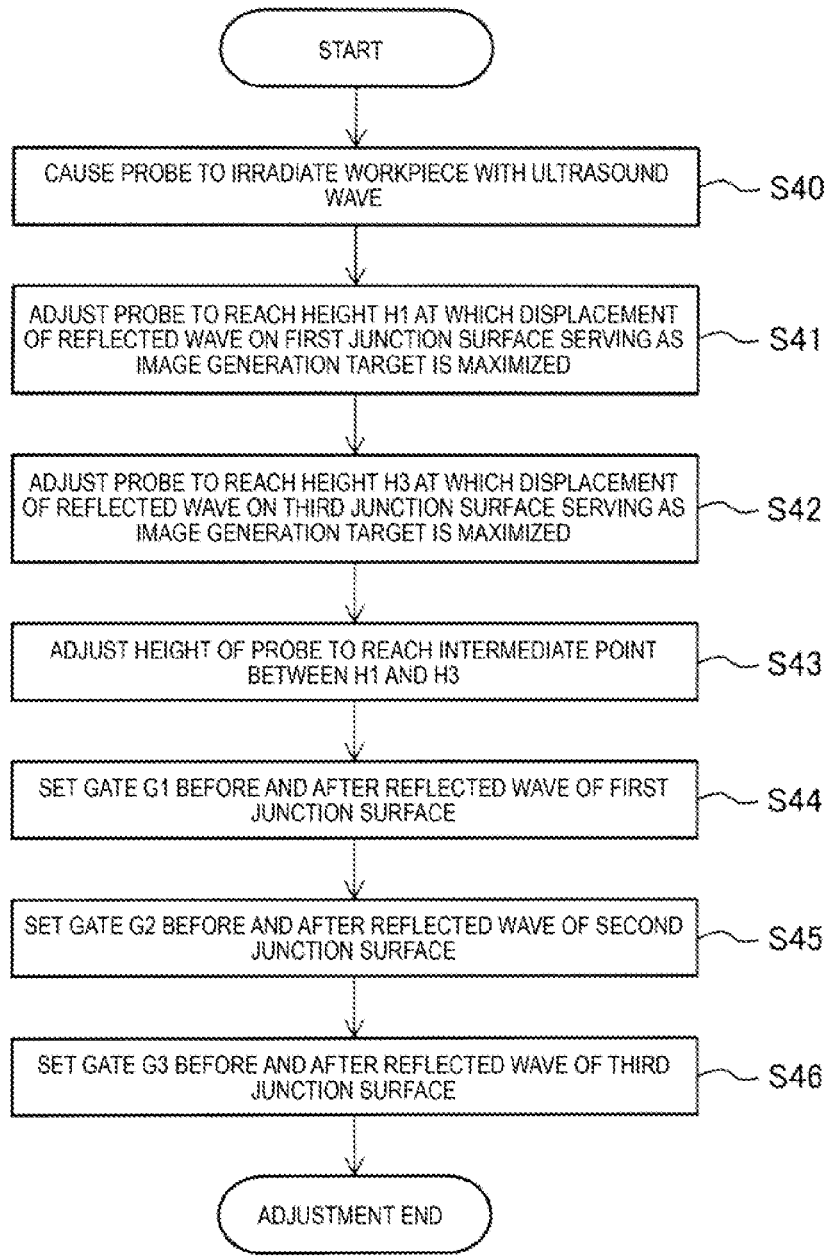

[Fig. 15]
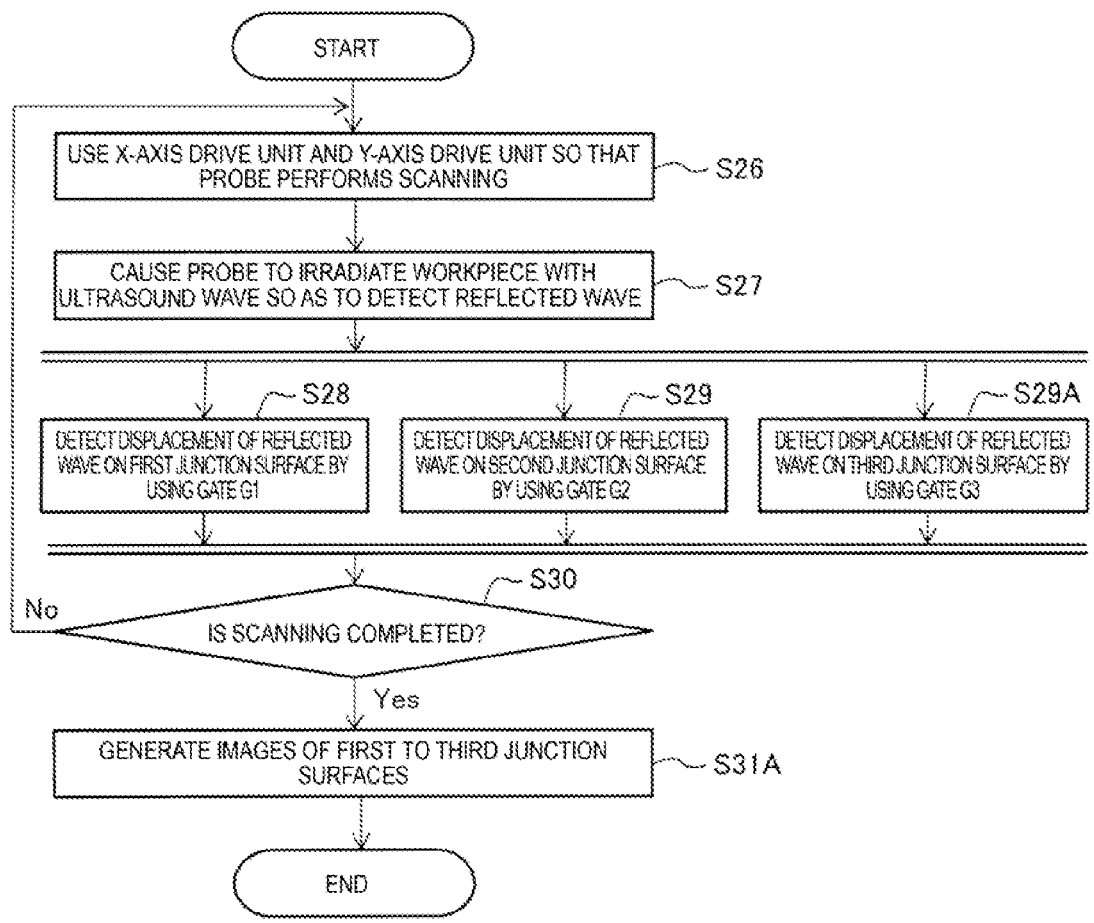

ULTRASOUND IMAGING DEVICE AND METHOD OF GENERATING IMAGE FOR ULTRASOUND IMAGING DEVICE

TECHNICAL FIELD

The present invention relates to an ultrasound imaging device and a method of generating an image for an ultrasound imaging device, in which a non-destructive inspection is performed on a junction surface inside a workpiece by using an ultrasound wave.

BACKGROUND ART

In the related art, any desired junction surface of a multi-junction semiconductor has been inspected as follows. The multi-junction semiconductor is irradiated with an ultrasound wave, and the junction surface is inspected, based on a reflected wave therefrom. For example, claim 1 in PTL 1 discloses an ultrasound inspection device which emits the ultrasound wave to a subject so as to inspect the junction surface inside the subject, based on a reflected wave signal thereof.

CITATION LIST

Patent Literature

PTL 1: JP-A-2-57968

SUMMARY OF INVENTION

Technical Problem

According to an ultrasound imaging device configured in this way, in a case of acquiring an image of a plurality of the junction surfaces of the multi-junction semiconductor, it is necessary to provide probes as many as the image acquisition target junction surfaces, and the ultrasound imaging device. Then, it is necessary to acquire the image of the respective junction surfaces by causing the respective probes to irradiate the respectively corresponding junction surfaces with the ultrasound wave.

For example, in an in-line semiconductor inspection system which inspects a defect in the multi-junction semiconductor, four probes are required when the image of four junction surfaces is acquired and inspected, thereby causing a problem in terms of cost.

Therefore, an object of the present invention is to provide an ultrasound imaging device and a method of generating an image for an ultrasound imaging device, which are capable of simultaneously visualizing a plurality of junction surfaces of a workpiece.

Solution to Problem

In order to solve the above-described problem, an ultrasound imaging device according to the present invention includes signal processing means for causing a probe to irradiate a multi-junction semiconductor with an ultrasound wave having a predetermined frequency, and for performing gate processing on a reflected wave of the ultrasound wave detected by the probe so as to output a displacement of the reflected wave on two junction surfaces of the multi-junction semiconductor, image generation means for generating respective images of the two junction surfaces, based on the displacement of the respective reflected waves on the two junction surfaces, and height adjustment means for adjusting a height of a focus of the probe. The height adjustment means adjusts the height of the focus of the probe to reach a first altitude at which the displacement of the reflected wave corresponding to one of the two junction surfaces is maximized, adjusts the height of the focus of the probe to reach a second altitude at which the displacement of the reflected wave corresponding to the other one of the two junction surfaces is maximized, and thereafter, adjusts the height of the focus of the probe to reach between the first altitude and the second altitude. The signal processing means sets a first gate by using the first altitude, sets a second gate by using the second altitude, and performs the gate processing using the first and second gates on the reflected wave of the ultrasound wave detected by the probe so as to generate the respective images of the two junction surfaces.

The other means will be described with reference to embodiments of the invention.

Advantageous Effects of Invention

According to the present invention, it is possible to simultaneously visualize a plurality of junction surfaces of a workpiece.

BRIEF DESCRIPTION OF DRAWINGS

FIG. 1 is a configuration diagram of an ultrasound imaging device.

FIG. 2 is a view illustrating an inspection method of a junction surface on a front surface side and a junction surface on a rear surface side according to a comparative example.

FIG. 3 is a view illustrating an adjustment method of a probe according to the comparative example.

FIG. 4 is a view illustrating an operation of a gate circuit according to the comparative example.

FIG. 5 is a flowchart illustrating an adjustment process and a visualization process according to the comparative example.

FIG. 6 is a view illustrating an inspection method of a junction surface close to a front surface and a junction surface close to a rear surface according to a first embodiment.

FIG. 7 is a view illustrating an adjustment method of a probe according to the first embodiment.

FIG. 8 is a view illustrating an operation of a gate circuit according to the first embodiment.

FIG. 9 is a view illustrating an adjustment method of the probe for the junction surface close to the rear surface.

FIG. 10 is a flowchart illustrating an adjustment process and a visualization process according to the first embodiment.

FIG. 11 is a view illustrating template matching for junction surface images.

FIG. 12 is a view illustrating an adjustment method of a probe according to a second embodiment.

FIG. 13 is a view illustrating an operation of a gate circuit according to the second embodiment.

FIG. 14 is a flowchart illustrating an adjustment process according to the second embodiment.

FIG. 15 is a flowchart illustrating a visualization process according to the second embodiment.

DESCRIPTION OF EMBODIMENTS

Hereinafter, a comparative example and embodiments of the present invention will be described in detail with reference to the respective drawings.

FIG. 1 is a configuration diagram of an ultrasound imaging device 4.

The ultrasound imaging device 4 illustrated in FIG. 1 generates and inspects an image of any desired junction surface of a multi-junction semiconductor serving as a workpiece 1 by using a probe 2 which transmits and receives an ultrasound wave. The workpiece 1 includes junction surface 11a to 11d. The ultrasound imaging device 4 adjusts the probe 2 to a desired height by using a control device 3, and causes the probe 2 whose height is adjusted to perform scanning in a planar direction. In FIG. 1, different elements in first and second embodiments and the comparative example will be described. However, common elements will not be specifically described.

The control device 3 is configured to include an encoder 34 which encodes each position of an X-axis drive unit 31, a Y-axis drive unit 32, and a Z-axis drive unit 33, and each position in XYZ-directions of the probe 2. The control device 3 drives the probe 2 in a height direction by using the Z-axis drive unit 33, and acquires the position in the height direction from the encoder 34, thereby adjusting the probe 2 to reach a desired height. Thereafter, the control device 3 causes the probe 2 to perform scanning in a planar direction by using the X-axis drive unit 31 and the Y-axis drive unit 32, and causes the encoder 34 to acquire a position in a horizontal direction.

The probe 2 includes a piezoelectric element 21. A lower portion of the probe 2 is immersed in water filling a water tank (not illustrated), and the piezoelectric element 21 is located so as to face the workpiece 1. The probe 2 in FIG. 1 has a focus F between a junction surface 11b and a junction surface 11c of the workpiece 1.

The ultrasound imaging device 4 includes a height adjustment unit 41 (height adjustment means) that adjusts the height of the probe 2 and a scanning control unit 42 that controls a scanning position of the probe 2. The ultrasound imaging device 4 further includes a timing control unit 43 and an oscillator 44 which transmit the ultrasound wave, a signal input unit 45, a signal processing unit 46, and an image generation unit 47 which generate an ultrasound image from a reflected wave, and a display unit 48 that displays the ultrasound image.

The signal input unit 45 includes an amplifier that amplifies a signal of the reflected wave received by the probe 2, and an A/D converter that converts the signal of the reflected wave from an analog signal to a digital signal. The signal processing unit 46 performs gate processing on the signal of the reflected wave so as to detect a displacement.

The height adjustment unit 41 (example of height adjustment means) is connected to the control device 3. The control device 3 (portion of height adjustment means) is connected to the Z-axis drive unit 33 and the encoder 34. Based on an instruction of the height adjustment unit 41, the control device 3 drives the probe 2 in an upward/downward direction, and acquires the position in the height direction from the encoder 34 so as to output position information to the height adjustment unit 41. In this manner, the height adjustment unit 41 can adjust the height of the probe 2 with respect to the workpiece 1, and can acquire the position in the height direction of the probe 2. Operations of the height adjustment unit 41 are different between the first and second embodiments and the comparative example.

The scanning control unit 42 is connected to the control device 3. The control device 3 causes the X-axis drive unit 31 and the Y-axis drive unit 32 to control the scanning position in the horizontal direction of the probe 2, and current scanning position information of the probe 2 is received from the control device 3.

The timing control unit 43 outputs a timing signal (information) of the ultrasound wave to the oscillator 44, based on the scanning position information of the probe 2 which is acquired from the scanning control unit 42. The oscillator 44 and outputs a signal to the piezoelectric element 21 of the probe 2, based on the timing signal output by the timing control unit 43.

The piezoelectric element 21 has electrodes respectively attached to both sides of a piezoelectric film. The piezoelectric element 21 transmits the ultrasound wave from the piezoelectric film by applying a voltage between the two electrodes. Furthermore, the piezoelectric element 21 converts an echo wave (reflected wave) received by the piezoelectric film into a reflected wave signal which is a voltage generated between the two electrodes. The signal input unit 45 amplifies the reflected wave signal, and converts the amplified signal into a digital signal.

The signal processing unit 46 processes the digital signal of the reflected wave signal. The signal processing unit 46 cuts out only a predetermined period of the reflected wave signal by using a gate pulse output by the timing control unit 43, and acquires displacement information so as to output the displacement information to the image generation unit 47. The image generation unit 47 generates an ultrasound image, based on a displacement signal output by the signal processing unit 46. Operations of the signal processing unit 46 are different between the first and second embodiments and the comparative example.

Hereinafter, the comparative example will be described with reference to FIGS. 2 to 5.

FIG. 2 is a view illustrating an inspection method of junction surfaces 11 and 11b close to a front surface 13a and junction surfaces 11c and 11d close to a rear surface 13b according to a comparative example.

Workpieces 1a to 1d are transported from the left to the right while being placed on a transport mechanism 8. The workpieces 1a to 1d and the transport mechanism 8 are immersed in water 7 of a water tank 6.

The workpiece 1a is inspected by the probe 2a installed above the workpiece 1a. The probe 2a first irradiates the front surface of the workpiece 1a with the ultrasound wave so as to inspect the junction surface 11a close to the front surface.

The workpiece 1b located on the right side is inspected by the probe 2b installed above the workpiece 1b. The probe 2b first irradiates the front surface of the workpiece 1b with the ultrasound wave so as to inspect the other junction surface 11b close to the front surface.

The workpiece 1c located on the right side is inspected by the probe 2c installed below the workpiece 1c. The probe 2c first irradiates the rear surface of the workpiece 1c with the ultrasound wave so as to inspect the junction surface 11c close to the rear surface. In this way, the ultrasound wave is not attenuated, and is reflected on the junction surface 11c. Accordingly, the ultrasound image can be clearly generated.

The workpiece 1d located on the right side is inspected by the probe 2d installed below the workpiece 1d. The probe 2d first irradiates the rear surface of the workpiece 1d with the ultrasound wave so as to inspect the other junction surface 11d close to the rear surface. In this way, the ultrasound wave is not attenuated, and is reflected on the junction surface 11d. Accordingly, the ultrasound image can be clearly generated.

According to the comparative example, the four probes 2a to 2d and four ultrasound imaging devices 4 (not illustrated)

are required in order to examine the four junction surfaces 11a to 11d. Furthermore, the probes 2c and 2d are installed to face upward. Accordingly, foreign substances are likely to be accumulated on a tip of the probes 2c and 2d. The probes 2c and 2d have to be all immersed in the water 7. Therefore, the probes 2c and 2d and a cable thereof need a waterproofing countermeasure, thereby causing a problem in the water tank 6 needs to be extremely deep.

Hereinafter, the respective probes 2a to 2d will be referred to simply as the probe 2 when these are not particularly distinguished from each other.

FIGS. 3(a) and 3(b) are views illustrating an adjustment method of the probe 2 according to the comparative example. Here, FIGS. 3(a) and 3(b) illustrate a state when the height adjustment is completed for the probe 2a illustrated in FIG. 2.

FIG. 3(a) is a sectional view of the workpiece 1a (refer to FIG. 2).

For example, the workpiece 1a is the multi-junction semiconductor, and is configured so that layers 12a to 12e are stacked one on another in the order from above. The upper side of the workpiece 1a is the front surface 13a, and the lower side is the rear surface 13b. The layer 12a and the layer 12b are joined to each other by the junction surface 22a. The layer 12b and the layer 12c are joined to each other by the junction surface 11b. The layer 12c and the layer 12d are joined to each other by the junction surface 11c. The layer 12d and the layer 12e are joined to each other by the junction surface 22d. Here, the probe 2a (refer to FIG. 2) is installed above the workpiece 1a, and irradiates the workpiece 1a with the ultrasound wave. The height adjustment unit 41 adjusts the probe 2a to reach a height which maximizes the displacement of the reflected wave on the junction surface 11a. A waveform of the reflected wave in this case is illustrated in FIG. 3(b) so as to correspond to each portion of the workpiece 1a.

The reflected wave is greatly displaced on the front surface 13a, the junction surfaces 11a to 11d, and the rear surface 13b. That is, the ultrasound wave is reflected on the front surface 13a, the junction surfaces 11a to 11d, and the rear surface 13b. Here, displacement W1 of the reflected wave on the junction surface 11a serving as an observation target is greater than the displacement of the junction surfaces 11b to 11d. The displacement of the reflected wave on the junction surface 11c located below is smaller than the displacement of the reflected wave of the junction surface 11b. Accordingly, the ultrasound wave is attenuated due to a distance. The focus F of the probe 2 is located in the vicinity of the junction surface 11a.

Then, a gate G0 is set to a timing of the reflected wave on the junction surface 11a. In this manner, the displacement of the reflected wave on the junction surface 11a can be output.

FIG. 4 is a view illustrating an operation of a gate circuit 461 according to the comparative example. Here, the signal processing unit 46 of the ultrasound imaging device 4 connected to the probe 2a (refer to FIG. 2) will be described.

The signal processing unit 46 is configured to include the gate circuit 461. Waveform data having the reflected wave incorporated therein and data relating to the gate G0 are input to the gate circuit 461, and gate processing is performed on the data so as to output a displacement W0. The data relating to the gate G0 is configured to include a start timing of the gate G0, a width of the gate G0, and a determination threshold. The gate circuit 461 detects the displacement W0 of the reflected wave which exceeds the determination threshold, with respect to the reflected wave inside the preset gate G0.

FIG. 5 is a flowchart illustrating an adjustment process and a visualization process according to the comparative example. Here, a process of the ultrasound imaging device 4 connected to the probe 2a (refer to FIG. 2) will be described.

When the junction surface 11a of the workpiece 1 is observed, the height adjustment unit 41 of the ultrasound imaging device 4 first causes the probe 2 to irradiate the workpiece 1 with the ultrasound wave (Step S10). Then, the height adjustment unit 41 adjusts the height of the probe 2 so as to maximize the displacement W1 of the reflected wave on the junction surface 11a serving as an observation target (Step S11). In this case, the focus F of the probe 2 is located in the vicinity of the junction surface 11a serving as the observation target. Next, the height adjustment unit 41 sets the gate G0 to the timing of the reflected wave on the junction surface 11a (Step S12), and completes the adjustment.

If a predetermined scanning instruction is given after the adjustment is completed, the workpiece 1 is scanned. The scanning control unit 42 uses the X-axis drive unit 31 and the Y-axis drive unit 32 so that the probe 2 performs the scanning in the horizontal direction (Step S13). The probe 2 irradiates the workpiece 1 with the ultrasound wave having a predetermined frequency (Step S14). The signal processing unit 46 processes the reflected wave by using the gate G0, thereby detecting the displacement of the reflected wave on the junction surface 11a (Step S15). Next, if the scanning is not completed (Step S16: No), the scanning control unit 42 returns to the process in Step S13, and repeatedly performs the scanning.

If the scanning control unit 42 determines that the scanning is completed (Step S16: Yes), the image generation unit 47 generates an image of the junction surface 11a (Step S17), and completes a series of processes.

The height of the probe 2 is adjusted in advance to a position at which the displacement of the junction surface 11a is maximized. Accordingly, it is possible to obtain a clear ultrasound image relating to the junction surface 11a.

Hereinafter, a configuration and an operation according to the first embodiment will be described in comparison with the comparative example with reference to FIGS. 6 to 11.

FIG. 6 is a view illustrating an inspection method of the junction surfaces 11a and 11b close to the front surface 13a and the junction surfaces 11c and 11d close to the rear surface 13b according to the first embodiment.

The workpieces 1e to 1h have a configuration which is the same as that of the workpiece 1 illustrated in FIG. 3(a). The workpieces 1e to 1h are transported from the left to the right while being placed on the transport mechanism 8, and are inverted up and down by the inversion mechanism 9. The workpieces 1e to 1h and the transport mechanism 8 are immersed in the water 7 of the water tank 6. The workpiece 1f is inspected by the probe 2f installed above the workpiece 1f. The probe 2f first irradiates the front surface 13a of the workpiece 1f with the ultrasound wave, and adjusts the focus between the junction surface 11a and the junction surface 11b so as to simultaneously inspect the junction surfaces 11a and 11b close to the front surface 13a. Thereafter, the inversion mechanism 9 inverts the workpiece 1, and the transport mechanism 8 transports the inverted workpiece 1 to move rightward.

The workpiece 1g on the right side is inspected by the probe 2g installed above the workpiece 1g. The probe 2g first irradiates the rear surface 13b of the workpiece 1g with the ultrasound wave, and adjusts the focus between the junction surface 11c and the junction surface 11d so as to simultaneously inspect the junction surfaces 11c and 11d close to the rear surface 13b. However, similar to the probe 2f, the probe 2g is installed to face downward. Accordingly, a tip portion of the probe 2g may be immersed in the water 7. In addition, the water tank 6 according to the first embodiment may be shallow unlike that according to the comparative example. Furthermore, according to the first embodiment, the four junction surfaces 11a to 11d can be inspected by the two probes 2f and 2g and the two ultrasound imaging devices 4 for connecting the two probes 2f and 2g.

Hereinafter, the probe 2f and 2g will be referred to simply as the probe 2 when these are not particularly distinguished from each other.

FIGS. 7(a) to 7(d) illustrate an adjustment method of the probe 2 according to the first embodiment.

A sectional view of the workpiece 1f illustrated in FIG. 7(a) is the same as that illustrated in FIG. 3(a). Here, the probe 2f is installed above the workpiece 1f, and irradiates the workpiece 16f with the ultrasound wave. The height adjustment unit 41 adjusts the probe 2f to reach a first altitude at which the displacement of the reflected wave on the junction surface 11a is maximized, adjusts the probe 2f to reach a second altitude at which the displacement of the reflected wave on the junction surface 11b is maximized, and thereafter, adjusts the probe 2f to reach an intermediate portion between the first altitude and the second altitude.

FIG. 7(b) is a waveform of the reflected wave when the probe 2f is adjusted to reach the first altitude, and the waveform is illustrated so as to correspond to each portion of the workpiece 1f.

The reflected wave is greatly displaced on the front surface 13a, the junction surfaces 11a to 11d, and the rear surface 13b. Each displacement of the reflected wave is gradually attenuated as the displacement is away from the probe 2f. Here, a displacement W1 of the reflected wave on the junction surface 11a serving as the observation target is greater than the displacement of the junction surfaces 11b to 11d. The focus F of the probe 2f is located in the vicinity of the junction surface 11a.

FIG. 7(c) is a waveform of the reflected wave when the probe 2f is adjusted to reach the second altitude, and the waveform is illustrated so as to correspond to each portion of the workpiece 1f.

The reflected wave is greatly displaced on the front surface 13a, the junction surfaces 11a to 11d, and the rear surface 13b. Here, a displacement W2 of the reflected wave on the junction surface 11b serving as the observation target is greater than the displacement of the junction surfaces 11a and 11c. The focus F of the probe 2f is located in the vicinity of the junction surface 11b.

FIG. 7(d) is a waveform of the reflected wave when the probe 2f is adjusted to reach between the first altitude and the second altitude, and the waveform is illustrated so as to correspond to each portion of the workpiece 1f.

The reflected wave is greatly displaced on the front surface 13a, the junction surfaces 11a to 11d, and the rear surface 13b. Here, the displacement of the reflected wave on the junction surface 11a and 11b serving as the observation target is greater than the displacement of the junction surfaces 11c and 11d. The focus F of the probe 2f is located in a substantially intermediate portion between the junction surface 11a and the junction surface 11b.

Then, a gate G1 is set to the timing of the reflected wave on the junction surface 11a, and a gate G2 is set to the timing of the reflected wave on the junction surface 11b. In this manner, the displacement caused by the junction surface 11a and the displacement caused by the junction surface 11b can be simultaneously output in one reflected wave.

According to the first embodiment, it is desirable that the focus F of the probe 2f is located in a range where a ratio between a distance from the junction surface 11a and a distance from the junction surface 11b is from 4 to 6 to 6 to 4. In this case, the ultrasound imaging device 4 can clearly and simultaneously obtain both the image of the junction surface 11a and the image of the junction surface 11b. FIG. 8 is a view illustrating an operation of the gate circuits 461 and 462 according to the first embodiment. The signal processing unit 46 of the ultrasound imaging device 4 to which the probe 2f illustrated in FIG. 6 is connected is configured to include the gate circuits 461 and 462.

Waveform data having the reflected wave incorporated therein and data relating to the gate G1 are input to the gate circuit 461, and the gate processing is performed thereon so as to output a displacement W1a (refer to FIG. 7(d)). The data relating to the gate G1 is configured to include the start timing of the gate G1, the width of the gate G1, and the determination threshold. The gate circuit 461 detects the displacement W1a of the reflected wave which exceeds the determination threshold, with respect to the reflected wave inside the preset gate G1.

Furthermore, the waveform data having the reflected wave incorporated therein and the data relating to the gate G2 are input to the gate circuit 462, and the gate processing is performed thereon in parallel so as output a displacement W2a (refer to FIG. 7(d)). The data relating to the gate G2 is configured to include the start timing of the gate G2, the width of the gate G2, and the determination threshold. The gate circuit 462 detects the displacement W2a of the reflected wave which exceeds the determination threshold, with respect to the reflected wave inside the preset gate G2.

FIGS. 9(a) and 9(b) are views illustrating a height adjustment method of the probe 2g with respect to the two junction surfaces 11d and 11c close to the rear surface 13b. FIG. 9(a) illustrates a cross section of the workpiece 1g illustrated in FIG. 6.

A sectional view of the workpiece 1g illustrated in FIG. 9(a) is inverted up and down compared to that illustrated in FIG. 7(a). Here, the probe 2g is installed above the workpiece 1g, and irradiates the workpiece 1g with the ultrasound wave. The height adjustment unit 41 adjusts the probe 2 to reach a third altitude at which the displacement of the reflected wave on the junction surface 11d is maximized, adjusts the probe 2 to reach a fourth altitude at which the displacement of the reflected wave on the junction surface 11c is maximized, and thereafter, adjusts the probe 2 to reach an intermediate portion between the third altitude and the fourth altitude.

FIG. 9(b) illustrates a waveform of the reflected wave when the probe 2 is adjusted to reach the intermediate portion between the third altitude and the fourth altitude, and the waveform is illustrated so as to correspond to each portion of the workpiece 1.

The reflected wave is greatly displaced on the rear surface 13b, the junction surfaces 11d to 11a, and the front surface 13a. Here, the displacement of the reflected wave on the junction surfaces 11d and 11c serving as the observation target is greater than the displacement of the other junction surfaces 11b and 11a. The focus F of the probe 2 is located in a substantially intermediate portion between the junction surface 11d and the junction surface 11c. A gate G4 is set to the timing of the reflected wave on the junction surface 11d, and a gate G5 is set to the timing of the reflected wave on the junction surface 11c.

According to the first embodiment, without installing the probe 2 below the workpiece 1, the junction surface close to the rear surface 13b of the workpiece 1 can be easily inspected using the ultrasound wave. In addition, the four junction surfaces 11a to 11d can be inspected using the two probes 2f and 2g installed above the workpiece 1.

FIG. 10 is a flowchart illustrating an adjustment process and a visualization process of the first embodiment.

When the junction surface 11a of the workpiece 1 is observed, the height adjustment unit 41 of the ultrasound imaging device 4 first causes the probe 2 to irradiate the workpiece 1 with the ultrasound wave (Step S20). Then, the height adjustment unit 41 adjusts the probe 2 to reach a height H1 so as to maximize the displacement W1 of the reflected wave on one junction surface 11a (first junction surface) serving as the observation target (Step S21). In this case, the focus F of the probe 2 is located in the vicinity of the junction surface 11a. Next, the height adjustment unit 41 adjusts the probe 2 to reach a height H2 so as to maximize the displacement W2 of the reflected wave on the other junction surface 11b (second junction surface) serving as the observation target (Step S22). In this case, the focus F of the probe 2 is located in the vicinity of the junction surface 11b.

Thereafter, the height adjustment unit 41 adjusts the probe 2 to reach an intermediate point between the height H1 and the height H2 (Step S23). The height adjustment unit 41 sets the gate G1 before and after the reflected wave of the junction surface 11a (first junction surface) (Step S24), and sets the gate G2 before and after the reflected wave of the junction surface 11b (second junction surface) (Step S25), thereby completing the adjustment.

The height adjustment unit 41 sets the gates G1 and G2 in the signal processing unit 46. Specifically, the height adjustment unit 41 sets the start timing, the width, and the determination threshold in setting the gates G1 and G2. A setting value of the gates G1 and G2 may be determined depending on the displacement of the reflected wave. In addition, a central value of the gates G1 and G2 may be obtained from the heights H1 and H2 and the position in the height direction of the probe 2. Specifically, if twice the relative distance between the height H1 and the position in the height direction of the probe 2 is divided by sound speed in the water, the result shows a time required for reciprocating the relative distance between the first junction surface and the focus F. If the time required for reciprocating the relative distance between the first junction surface and the focus F is subtracted from a time required for receiving the reflected wave from the focus F irradiated with the ultrasound wave by the probe 2, it is possible to obtain the central value of the gate G1. Similarly, the central value of the gate G2 may be obtained from the height H2 and the position in the height direction of the probe 2.

After the adjustment is completed, if a user gives a predetermined scanning instruction, the workpiece 1 is scanned. The scanning control unit 42 uses the X-axis drive unit 31 and the Y-axis drive unit 32 so that the probe 2 performs the scanning in the horizontal direction (Step S26). The probe 2 irradiates the workpiece 1 with the ultrasound wave having a predetermined frequency (Step S27).

The signal processing unit 46 processes the reflected wave by using the gate G1, thereby detecting the displacement of the reflected wave on the junction surface 11a (Step S28). The signal processing unit 46 processes the reflected wave by using the gate G2, thereby detecting the displacement of the reflected wave on the junction surface 11b (Step S29). The gate processing in Step S28 and the gate processing in Step S29 are performed thereon in parallel. Accordingly, the ultrasound imaging device 4 can quickly and simultaneously generate the image of the junction surface 11a and the image of the junction surface 11b.

Next, if the scanning is not completed (Step S30: No), the scanning control unit 42 returns to the process in Step S26, and repeatedly performs the scanning.

If the scanning control unit 42 determines that the scanning is completed (Step S30: Yes), the image generation unit 47 generates an image of the junction surface 11a and the image of the junction surface 11b (Step S31), and completes a series of processes.

The height of the probe 2 is adjusted in advance to reach the intermediate point between the position at which the displacement of the junction surface 11a is maximized and the position at which the displacement of the junction surface 11b is maximized. Accordingly, it is possible to simultaneously obtain the clear ultrasound image relating to the junction surface 11a and the clear ultrasound image relating to the junction surface 11b.

FIG. 11 is a view illustrating template matching for the junction surface images according to the first embodiment.

A template image 50 is located most above, and junction surface images 51 and 52 are located below the template image 50. An upper right reference position 501 and a lower left reference position 502 are illustrated on the template image 50, and an inspection region 503 is further illustrated.

The junction surface image 51 shows an upper right reference position 511 and a lower left reference position 512. The reference position 511 matches the template image 50 so as to be associated with the reference position 501 on the template image 50. The reference position 512 matches the template image 50 so as to be associated with the reference position 502 on the template image 50. An inspection region 513 on the junction surface image 51 can be easily identified by using a relative relationship between the reference positions 511 and 512.

The junction surface image 52 shows an upper right reference position 521 and a lower left reference position 522. The reference position 521 is a position scanned simultaneously with the reference position 511 on the junction surface image 51. The reference position 522 is the position scanned simultaneously with the reference position 512 on the junction surface image 51. That is, without directly matching the junction surface image 52 with the template image 50, the reference positions 521 and 522 can be associated with the reference positions 501 and 502 on the template image 50. An inspection region 523 on the junction surface image 52 can be easily identified by using the relative relationship between the reference positions 511 and 512.

Hereinafter, a device and a method will be described which inspect the two junction surfaces 11d and 11c close to the rear surface 13b after the two junction surfaces 11a and 11b close to the front surface 13a are inspected.

FIGS. 12(a) and 12(b) are views illustrating an adjustment method of the probe according to a second embodiment.

A sectional view of the workpiece 1 illustrated in FIG. 12(a) is the same as that illustrated FIG. 3(a). Here, the probe 2 is installed above the workpiece 1, and irradiates the workpiece 1 with the ultrasound wave. The height adjustment unit 41 adjusts the probe 2 to reach the first altitude at which the displacement of the reflected wave on the junction surface 11a is maximized, adjusts the probe 2 to reach the third altitude at which the displacement of the reflected wave on the junction surface 11c is maximized, and thereafter, adjusts the probe 2 to reach the intermediate portion between the first altitude and the third altitude. Unlike the first embodiment, according to the second embodiment, the gates G1 to G3 are respectively set on the junction surface 11a to 11c.

FIG. 12(b) illustrates a waveform of the reflected wave when the probe 2 is adjusted to reach the intermediate portion between the first altitude and third altitude, and the waveform is illustrated so as to correspond to each portion of the workpiece 1.

The reflected wave is greatly displaced on the front surface 13a, the junction surfaces 11a to 11d, and the rear surface 13b. Here, the displacement of the reflected wave of the junction surfaces 11a to 11c serving as the observation target is greater than the displacement of the reflected wave on the other junction surface 11d. The focus F of the probe 2 is located in a substantially intermediate portion between the junction surface 11a and the junction surface 11c.

The gate G1 is set to the timing of the reflected wave on the junction surface 11a, the gate G2 is set to the timing of the reflected wave on the junction surface 11b, and the gate G3 is set to the reflected wave on the junction surface 11c. In this manner, it is possible to simultaneously output the displacement of the junction surface 11a, the displacement of the junction surface 11b, and the displacement of the junction surface 11c in one reflected wave.

In a third embodiment, it is also desirable that the focus F of the probe 2 is located in a range where a ratio between the distance from the junction surface 11a and the distance from the junction surface 11b is from 4 to 6 to 6 to 4. In this case, the ultrasound imaging device 4 can clearly and simultaneously obtain both the image of the junction surface 11a, the image of the junction surface 11b, and the image of the junction surface 11c.

FIG. 13 is a view illustrating an operation of the gate circuits 461 to 463 according to the first embodiment. The signal processing unit 46 is configured to include the gate circuits 461 to 463.

The waveform data having the reflected wave incorporated therein and the data relating to the gate G1 are input to the gate circuit 461, and the gate processing is performed thereon so as to output the displacement W1b (refer to FIG. 13(b)). The data relating to the gate G1 is configured to include the start timing of the gate G1, the width of the gate G1, and the determination threshold. The gate circuit 461 detects a displacement W1b of the reflected wave which exceeds the determination threshold, with respect to the reflected wave inside the preset gate G1.

The waveform data having the reflected wave incorporated therein and the data relating to the gate G2 are input to the gate circuit 462, and the gate processing is performed thereon in parallel so as to output a displacement W2b (refer to FIG. 13(b)). The data relating to the gate G2 is configured to include the start timing of the gate G2, the width of the gate G2, and the determination threshold. The gate circuit 462 detects the displacement W2b of the reflected wave which exceeds the determination threshold, with respect to the reflected wave inside the preset gate G2.

Furthermore, the waveform data having the reflected wave incorporated therein and the data relating to the gate G3 are input to the gate circuit 463, and the gate processing is performed thereon in parallel so as to output a displacement W3b (refer to FIG. 13(b)). The data relating to the gate G3 is configured to include the start timing of the gate G3, the width of the gate G3, and the determination threshold. The gate circuit 463 detects the displacement W3b of the reflected wave which exceeds the determination threshold, with respect to the reflected wave inside the preset gate G3.

FIG. 14 is a flowchart illustrating an adjustment process according to the second embodiment.

When the junction surface 11a of the workpiece 1 is observed, the height adjustment unit 41 of the ultrasound imaging device 4 first causes the probe 2 to irradiate the workpiece 1 with the ultrasound wave (Step S40). Then, the height adjustment unit 41 adjusts the probe 2 to reach the height H1 so as to maximize the displacement W1 of the reflected wave on the junction surface 11a (first junction surface) serving as the observation target (Step S41). In this case, the focus F of the probe 2 is located in the vicinity of one junction surface 11a. Next, the height adjustment unit 41 adjusts the probe 2 to reach the height H3 so as to maximize the displacement W3 of the reflected wave on the junction surface 11c (third junction surface) serving as the observation target (Step S42). In this case, the focus F of the probe 2 is located in the vicinity of the junction surface 11c.

Thereafter, the height adjustment unit 41 adjusts the probe 2 to reach the intermediate point between the height H1 and the height H3 (Step S43). The height adjustment unit 41 sets the gate G1 before and after the reflected wave on the junction surface 11a (first junction surface) (Step S44), and sets the gate G2 before and after the reflected wave of the junction surface 11b (second junction surface) (Step S45). Furthermore, the height adjustment unit 41 sets the gate G3 before and after the reflected wave on the junction surface 11c (third junction surface) (Step S46), thereby completing the adjustment.

FIG. 15 is a flowchart illustrating a visualization process according to the second embodiment.

After the adjustment illustrated in FIG. 14 is completed, if a user gives a predetermined scanning instruction, the workpiece 1 is scanned. The scanning control unit 42 uses the X-axis drive unit 31 and the Y-axis drive unit 32 so that the probe 2 performs the scanning in the horizontal direction (Step S26). The probe 2 irradiates the workpiece 1 with the ultrasound wave having a predetermined frequency (Step S27).

The signal processing unit 46 processes the reflected wave by using the gate G1, thereby detecting the displacement of the reflected wave on the junction surface 11a (Step S28). The signal processing unit 46 processes the reflected wave by using the gate G2, thereby detecting the displacement of the reflected wave on the junction surface 11b (Step S29). Furthermore, the signal processing unit 46 processes the reflected wave by using the gate G3, thereby detecting the displacement of the reflected wave on the junction surface 11c (Step S29A). The gate processing in Step S28, the gate processing in Step S29, and the gate processing in Step S29A are performed thereon in parallel. Accordingly, the ultrasound imaging device 4 can quickly and simultaneously generate the image of the junction surface 11a, the image of the junction surface 11b, and the image of the junction surface 11c.

Next, if the scanning is not completed (Step S30: No), the scanning control unit 42 returns to the process in Step S26, and repeatedly performs the scanning.

If the scanning control unit 42 determines that the scanning is completed (Step S30: Yes), the image generation unit 47 generates an image of the junction surface 11a, the image of the junction surface 11b, and the image of the junction surface 11c (Step S31A), and completes a series of processes.

The height of the probe 2 is adjusted in advance to reach the intermediate point between the position at which the displacement of the junction surface 11a is maximized and the position at which the displacement of the junction surface 11c is maximized. Accordingly, it is possible to simultaneously obtain the clear ultrasound image relating to the junction surface 11a and the clear ultrasound image relating to the junction surface 11b.

MODIFICATION EXAMPLE

Without being limited to the above-described embodiments described above, the present invention includes various modification examples. For example, the embodiments have been described above in detail in order to facilitate the understanding of the present invention. The present invention is not necessarily limited to those which include all of the described configurations. Configurations according to a certain embodiment can be partially substituted with configuration of the other embodiment, or the configurations of the other embodiment can be added to the configurations of the certain embodiment. In addition, the configurations according to each embodiment can partially have additions, deletions, and substitutions of other configurations.

The respective configurations, functions, processing units, and processing means which are described above may be partially or entirely realized using hardware such as an integration circuit, for example. The respective configurations and functions which are described above may be realized using software by causing a processor to interpret and execute a program for realizing each function.

In the respective embodiments, control lines and information lines which are considered as required for the description are illustrated. Depending on a product, the respective embodiments are not necessarily limited to those in which all of the control lines and the information lines are illustrated. In actual, it may be considered that almost all of the configurations are connected to each other.

As a modification example according to the present invention, the following configurations (a) to (f) may be adopted, for example.

(a) According to the first embodiment, the images of the two junction surfaces are simultaneously generated, and according to the second embodiment, the images of the three junction surface are simultaneously generated. However, the present invention is not limited thereto. The images of four or more junction surfaces may be simultaneously generated. The number of the junction surfaces is not particularly limited.

(b) As long as the same reflected wave is processed, each gate processing in the above-described embodiments may be sequentially performed without being limited to the parallel operation.

(c) The height adjustment of the probe 2 is not limited to the adjustment using the Z-axis drive unit 33 and the encoder 34. The adjustment may be manually made.

(d) The workpiece 1 according to the above-described embodiments is not limited to the multi-junction semiconductor. The workpiece may be configured so that layers formed of three or more different materials are joined to one another.

(e) The focus F of the probe 2 may be set between the surface closest to the probe and the surface farthest away from the probe 2 out of the plurality of junction surfaces to be simultaneously inspected. The configuration is not particularly limited. For example, in a case where the junction surface 11a is primarily inspected and the junction surface 11b may be secondarily confirmed, the focus F of the probe 2 may be set so that the distance from the junction surface 11a is shorter than the distance from the junction surface 11b. For example, the ratio may be set as 5 to 5 to 3 to 7.

(f) It is desirable that the focus F of the probe 2 is set to be slightly closer to the surface farthest away from the probe 2 than the intermediate point between the surface closest to the probe surface and the surface farthest away from the probe 2 out of the plurality of junction surfaces to be simultaneously inspected. In this manner, the attenuation of the ultrasound wave which is caused by the distance is canceled. Therefore, a signal-to-noise ratio (S/N ratio) of the displacement on the surface farthest away from the probe 2 can be improved.

REFERENCE SIGNS LIST 1, 1a to 1h: workpiece (multi-junction semiconductor)
11a to 11d: junction surface
12a to 12e: layer
13a: front surface
13b: rear surface
2, 2a to 2d, 2f, 2g: probe
21: piezoelectric element
F: focus
3: control device (portion of height adjustment means)
31: X-axis drive unit
32: Y-axis drive unit
33: Z-axis drive unit (portion of height adjustment means)
34: encoder
4: ultrasound imaging device
41: height adjustment unit (portion of height adjustment means)
42: scanning control unit
43: timing control unit
44: oscillator
45: signal input unit
46: signal processing unit
461 to 463: gate circuit
47: image generation unit
48: display unit
50: template image
501, 502: reference position
503: inspection region
51, 52: junction surface image
511, 512, 521, 522: reference position
513, 523: inspection region
6: water tank
7: water
8: transport mechanism
9: inversion mechanism

The invention claimed is:

1. An ultrasound imaging device comprising:

signal processing means for causing a probe to irradiate a multi-junction semiconductor with an ultrasound wave having a predetermined frequency, and for performing gate processing on a reflected wave of the ultrasound wave detected by the probe so as to output a displacement of the reflected wave on two junction surfaces of the multi-junction semiconductor;

image generation means for generating respective images of the two junction surfaces, based on the displacement of the respective reflected waves on the two junction surfaces; and height adjustment means for adjusting a height of a focus of the probe, wherein the height adjustment means adjusts the height of the focus of the probe to reach a first altitude at which the displacement of the reflected wave corresponding to one of the two junction surfaces is maximized, adjusts the height of the focus of the probe to reach a second altitude at which the displacement of the reflected wave corresponding to the other one of the two junction surfaces is maximized, and thereafter, adjusts the height of the focus of the probe to reach between the first altitude and the second altitude, and wherein the signal processing means sets a first gate by using the first altitude, sets a second gate by using the second altitude, and performs the gate processing using the first and second gates on the reflected wave of the ultrasound wave detected by the probe so as to generate the respective images of the two junction surfaces.

2. The ultrasound imaging device according to claim 1, wherein the focus of the probe which is set by the height adjustment means is located in a range where a ratio between a distance from a surface closest to the probe and a distance from a surface farthest away from the probe out of the two junction surfaces is from 4 to 6 to 6 to 4.

3. The ultrasound imaging device according to claim 1, wherein the probe detects the reflected wave by irradiating the focus once with the ultrasound wave, and wherein the signal processing means performs the gate processing on the respective reflected waves so as to output the displacement of the respective reflected waves on the two junction surfaces.

4. The ultrasound imaging device according to claim 1, wherein if an inspection region is set in any one of the respective images of the two junction surfaces which are generated by the image generation means, a region the same as the inspection region is also set for the other image as the inspection region.

5. The ultrasound imaging device according to claim 1, further comprising:
  inversion means for inverting the multi-junction semiconductor up and down,
  wherein after the inversion means inverts the multi-junction semiconductor up and down, the height adjustment means adjusts the height of the probe so as to set the focus of the probe between the other two junction surfaces of the multi-junction semiconductor.

6. A method of generating an image for an ultrasound imaging device, the method comprising:
  irradiating a multi-junction semiconductor with an ultrasound wave having a predetermined frequency;
  adjusting a height of a probe for detecting a reflected wave of the ultrasound wave so that the probe reaches a first altitude at which a displacement of the reflected wave corresponding to one of two junction surfaces of the multi-junction semiconductor is maximized;
  adjusting the height of the probe so that the probe reaches a second altitude at which the displacement of the reflected wave corresponding to the other one of the two junction surfaces is maximized;
  setting the height of a focus of the probe between the first altitude and the second altitude;
  setting a first gate, based on a difference between the first altitude and the height of the focus of the probe;
  setting a second gate, based on a difference between the second altitude and the height of the focus of the probe;
  performing gate processing using the first and second gates on the reflected wave of the ultrasound wave detected by the probe so as to output a displacement of the reflected wave of the two junction surfaces of the multi-junction semiconductor; and
  generating respective image of the two junction surfaces, based on the displacement of the respective reflected waves on the two junction surfaces.

7. An ultrasound imaging device comprising;
  signal processing means for causing a probe to irradiate a multi-junction semiconductor with an ultrasound wave having a predetermined frequency, and for performing gate processing on a reflected wave of the ultrasound wave detected by the probe so as to output a displacement of the reflected wave on three or more junction surfaces of the multi-junction semiconductor;
  image generation means for generating respective images of the three or more junction surfaces, based on the displacement of the respective reflected waves on the three or more junction surfaces; and
  height adjustment means for adjusting a height of a focus of the probe,
  wherein the height adjustment means adjusts the height of the focus of the probe so that the height of the focus of the probe is adjusted to reach a first altitude at which the displacement of the reflected wave corresponding to the junction surface closest to the probe out of the three or more junction surfaces is maximized, and so that the height of the focus of the probe is adjusted to reach a second altitude at which the displacement of the reflected wave corresponding to the junction surface farthest away from the probe out of the three or more junction surfaces is maximized, and thereafter, sets the height of the focus of the probe to reach between the first altitude and the second altitude, and
  wherein the signal processing means sets a first gate by using the first altitude, sets a second gate by using the second altitude, and performs the gate processing using the first and second gates on the reflected wave of the ultrasound wave detected by the probe so as to generate the image of the junction surface closest to the probe out of the three or more junction surfaces and the image of the junction surface farthest away from the probe out of the three or more junction surfaces.

8. The ultrasound imaging device according to claim 2, further comprising:
  inversion means for inverting the multi-junction semiconductor up and down,
  wherein after the inversion means inverts the multi-junction semiconductor up and down, the height adjustment means adjusts the height of the probe so as to set the focus of the probe between the other two junction surfaces of the multi-junction semiconductor.

9. The ultrasound imaging device according to claim 3, further comprising:
  inversion means for inverting the multi-junction semiconductor up and down,
  wherein after the inversion means inverts the multi-junction semiconductor up and down, the height adjustment means adjusts the height of the probe so as to set the focus of the probe between the other two junction surfaces of the multi-junction semiconductor.

10. The ultrasound imaging device according to claim 4, further comprising:
  inversion means for inverting the multi-junction semiconductor up and down,
  wherein after the inversion means inverts the multi-junction semiconductor up and down, the height adjustment means adjusts the height of the probe so as to set the focus of the probe between the other two junction surfaces of the multi-junction semiconductor.

\* \* \* \* \*